United States Patent [19]

Tabellini

[11] Patent Number: 5,235,874
[45] Date of Patent: Aug. 17, 1993

[54] PROTECTIVE STRUCTURE, IN PARTICULAR FOR USE WITH A MACHINE TOOL OR SIMILAR WORK UNIT

[75] Inventor: Giorgio Tabellini, Bologna, Italy

[73] Assignee: P.E.I. Protezioni Elaborazoni Industriali S.r.l., Bologna, Italy

[21] Appl. No.: 897,241

[22] Filed: Jun. 11, 1992

[30] Foreign Application Priority Data

Dec. 12, 1991 [IT] Italy .................. B091A 000469

[51] Int. Cl.[5] .................. G05G 25/04; F16P 3/02
[52] U.S. Cl. .................. 74/608; 74/566; 384/15
[58] Field of Search .................. 74/566, 608; 384/15

[56] References Cited

U.S. PATENT DOCUMENTS

| | | | |
|---|---|---|---|
| 995,972 | 6/1911 | Larsen | 74/566 X |
| 1,679,912 | 8/1928 | Mondloch | 74/566 X |
| 2,417,671 | 3/1947 | Armitage | 384/15 |
| 2,417,672 | 3/1947 | Armitage | 384/15 |
| 2,551,860 | 5/1951 | Welte et al. | 384/15 |
| 2,615,762 | 10/1952 | Gesner | 384/15 |
| 2,850,332 | 9/1958 | Begle | 384/15 |
| 4,704,913 | 11/1987 | Zimmer | 74/566 X |
| 4,706,510 | 11/1987 | Zimmer | 74/566 X |

*Primary Examiner*—Richard M. Lorence
*Attorney, Agent, or Firm*—Hoffmann & Baron

[57] ABSTRACT

The invention relates to a protective structure associated with a work unit. The protective structure includes a mobile portion having movement in two senses according to a straight direction. The protective structure also includes two rotatable support elements idle about respective mutually parallel axes which are normal to the straight direction and which are internally supported by box structures connected to the mobile portion and which are arranged on opposite sides with respect to the mobile portion with reference to the straight direction. The protective structure further includes two blinds, respectively windable about the support elements and having a first end connected to the support element and a second end connected to a fixed structure on which a kinematic connector for the support element is supported. The protective structure also includes a compensating element interpositioned between the kinematic connector and the support element so as to equalize the peripheral velocities of tracts of the blinds wound about the support element. The tracts of the blinds which are not wound about the relative support elements develop at least partially according to at least one plane parallel to the said straight direction.

8 Claims, 4 Drawing Sheets

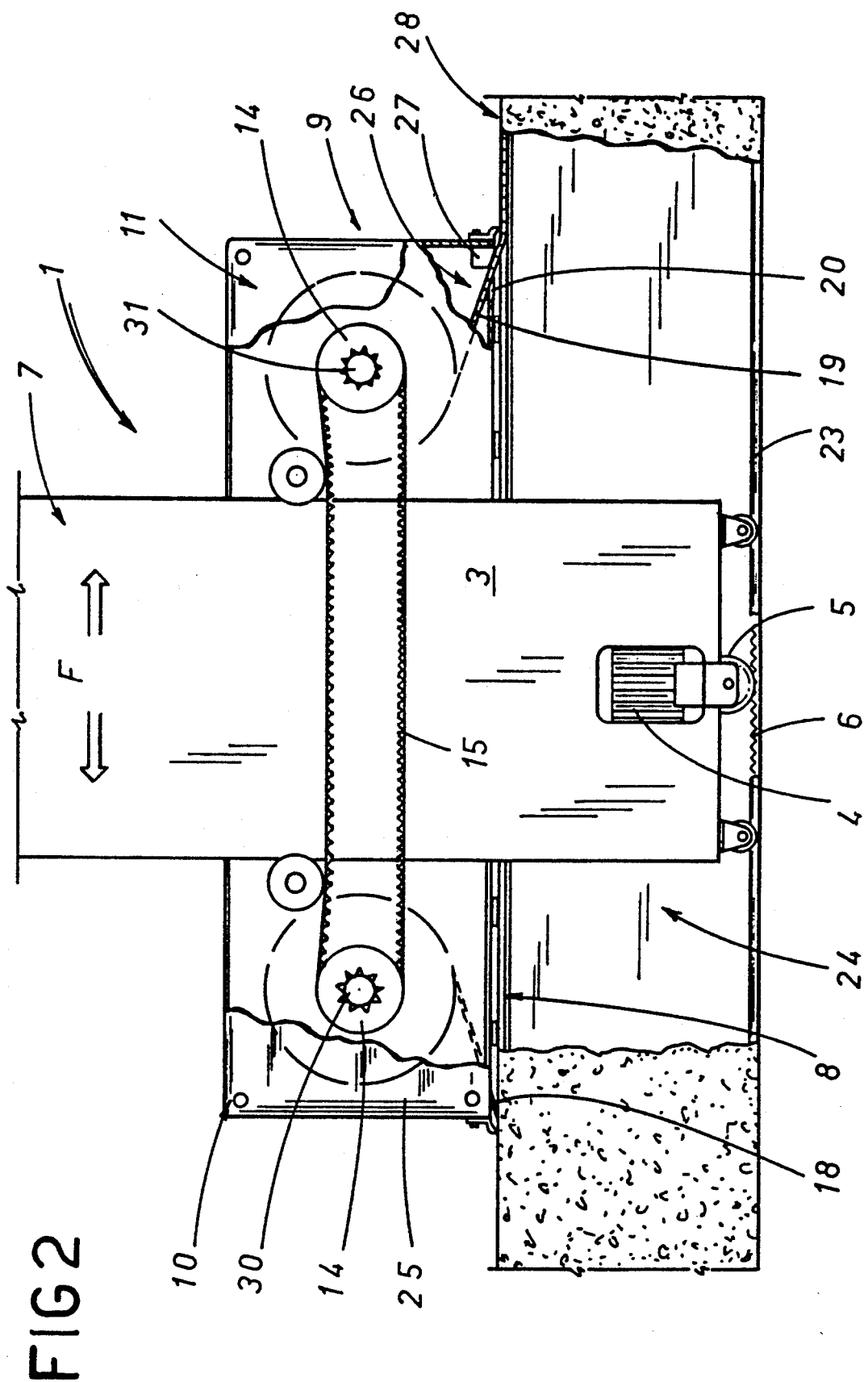

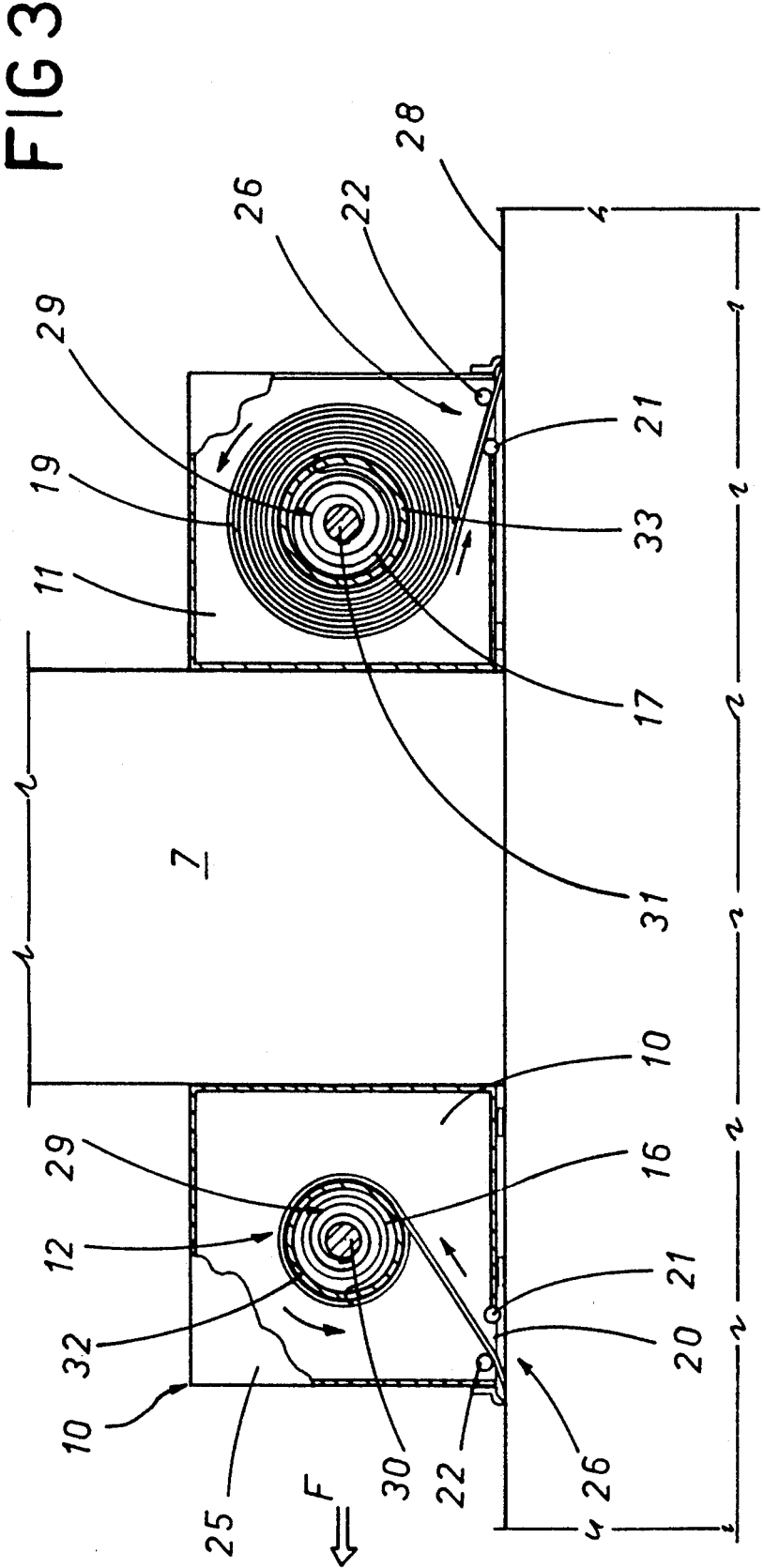

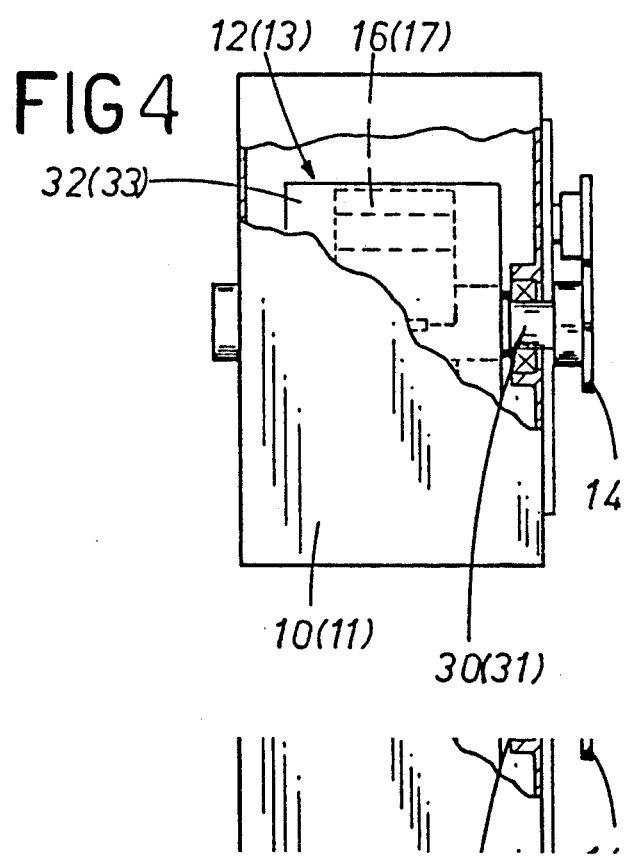

PROTECTIVE STRUCTURE, IN PARTICULAR FOR USE WITH A MACHINE TOOL OR SIMILAR WORK UNIT

BACKGROUND OF THE INVENTION.

The invention refers to a protective structure, in particular for use with a machine tool or similar work unit.

In particular, the object of the invention is a protective structure of the type referred to as a "roller blind", designed to screen determined portions of a work unit of any type.

The prior art protection structures of the above-mentioned type, frequently viable on foot with the aim of offering accident protection and hygienic work conditions to the operator, are usually used to screen areas of work units which must be accessible rapidly and automatically, both for functional reasons and for maintenance, and essentially comprise a flexible wall, which will be defined hereinafter as a "blind" for the sake of brevity, which blind is defined, for example, by a plurality of slats positioned in line and reciprocally non-rigidly constrained, for example by hinging with rotation possibility.

In their most pertinent embodiment, in the present invention the blinds develop along a plane and run along appropriate guide means. Taking for example blinds which are destined to close the upper floor of a pit for machines or work units in which the base or sliding plane of the upright of the mobile operating element is below the said unit access plane or upper floor, the two tracts of blind which develop along the said upper floor are connected by the opposite ends of the operating element which is able to move in the two senses according to the longitudinal development direction of the blind tracts themselves. The end portions of each blind are wound on respective elongated substantially cylindrical support elements, for example rollers. During the course of the movements in one sense or the other of the mobile operator element, the two tracts of blind vary their lengths, winding partially on to the relative elongated support elements or respectively partially unwinding from them.

In some cases the said elongated support means are connected to respective motor means able to produce a sliding in the two senses of the blind tracts, with consequent opposite variations in the quantity of blind respectively wound on one and the other of the elongated support elements. Alternatively, the elongated support means or rollers are not motorised, and instead are equipped with respective pre-loaded spiral springs which, while the blind runs in one direction or the other, drawn by the above-mentioned mobile operator element, are respectively either loaded or unloaded. Consequently, each time that the blind is moved in one sense or in the other with respect to a neutral position in which the said springs are loaded equally, when the motor direction is inverted the more loaded of the springs tends to ease the return of the blind itself towards the neutral position.

Obviously, the protective structures in which the said elongated support means are motorised are considerably expensive, since, apart from having the said motorised means, they imply the presence of complicated electronic switchboards able to regulate the activity of the motor means themselves.

Specifically, protective structures equipped with rollers with preloaded spiral springs give rise to another kind of drawback, particularly serious in the cases in which the said springs are part of work units equipped with mobile operating elements, connected to the said blinds, which elements must be able to reach and maintain at every moment very precise positions. When the blinds are not occupying the said neutral position the springs exert respectively different traction forces on the blinds themselves, with consequent subjecting of the mobile operating elements to non-zero resulting forces which vary its position. A common drawback of both the prior art solutions examined consists in the fact that the sliding of the blinds within the predetermined guides creates problems of noise, caused by considerable friction originating from the said sliding.

The aim of the present invention is thus that of eliminating the above-mentioned drawbacks.

In particular, one important aim of the present invention is that of providing a protective structure of the above-mentioned type which is simple and economical and does not influence negatively the functioning of the work unit incorporating the protective structure itself.

SUMMARY OF THE INVENTION

The invention, as characterised in the claims which follow, solves the problem of providing a protective structure, in particular usable for a machine tool or similar work unit, which said work unit comprises a mobile portion movable in both senses in a straight direction, characterised by the fact of comprising two rotatable support means idle about respective parallel axes which are normal to the said straight direction, said means being supported by support organs connected to the said mobile portion and arranged on opposite ends of the mobile portion itself with respect to the said straight direction; blind means respectively windable on to and unwindable from the said support means and exhibiting a first end connected to the relative support element and a second end connected to a fixed structure which supports the said second end; kinematic connecting means for the said support elements, and compensating elements interpositioned and acting between the said kinematic means and the said support means and with the function of equalising the peripheral velocity of the tracts of the blind wound about the said relative support means; the tracts of the said blind not wound around the relative support elements developing at least partially according to at least one plane parallel to the said straight direction.

BRIEF DESCRIPTION OF THE DRAWINGS

The advantages and characteristics of the present invention will better emerge from the detailed description that follows, made with reference to the accompanying drawings, which represent a preferred embodiment herein illustrated in the form of a non-limiting example, and in which:

FIG. 2 shows, in enlarged scale lateral view and partly in section, the protective structure of FIG. 1;

FIG. 3 shows, in a lateral view, a particular of the protective structure of FIG. 1; and FIG. 4 shows, in lateral view and with some parts removed better to evidence others, a particular of the protective structure of the preceding figures.

BRIEF DESCRIPTION OF THE PREFERRED EMBODIMENTS

Figure 1:
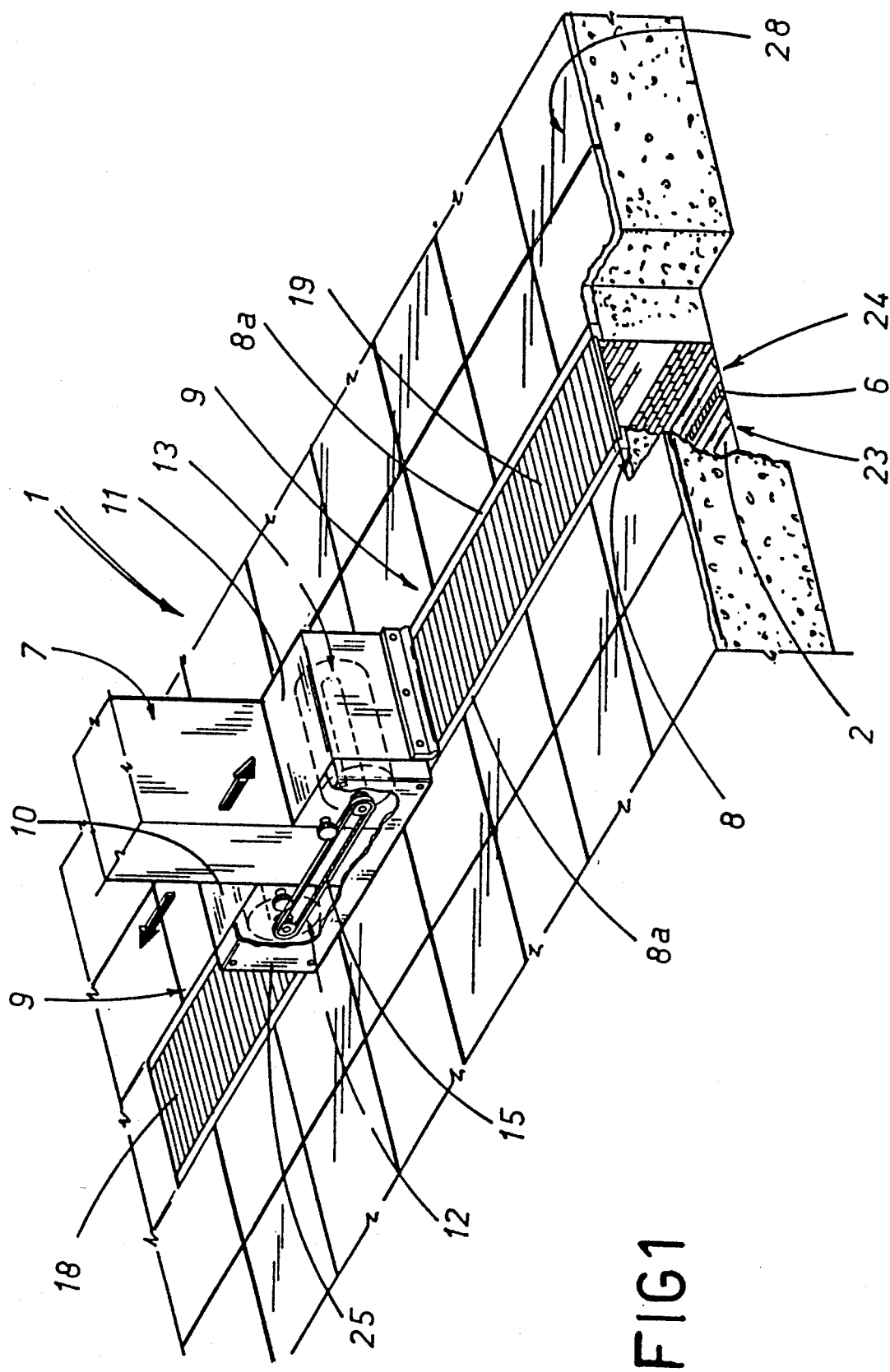
FIG. 1 shows a perpective schematic view of a work unit incorporating a protective structure made according to the present invention.

With reference to the figures, 1 denotes a work unit in its entirety, comprising an elongated sliding plane 2 for an upright 3 supported, for example, on track means 23. The translations of the upright 3 on the sliding plane 2 can occur in the two opposing senses according to a direction indicated by a double arrow F, and are caused by motor means 4 which, in the form of activation of the work unit 1 represented as an example in FIG. 2, set in rotation in both senses a horizontal-axis cogged wheel 5 arranged enmeshed with a rack 6 which develops longitudinally on the upper surface of the sliding plane 2.

The upright 3 superiorly supports an operating element 7, in the figures schematised in block-form, constituting together with the upright 3 a mobile portion of the work unit 1, which can be of any type, for example a toolhead or a measuring means. A superior portion of the upright 3, during the course of its movements travels between two support elements or support means 8 constituting a fixed structure being a part of a protective structure denoted in its entirety by 9; the said support elements 8 are essentially constituted by two parallel horizontal bars or rails 8a, parallel also to the movement direction of the said operating element 7.

Two box structures or support organs 10 and 11 (right and left in the accompanying drawings) are connected to two reciprocally opposite faces (with reference to the arrow F direction) of the superior portion of the upright 3, which support organs 10 and 11 are of substantially parallelopiped shape and are part, together with the elements contained within them, of the said protective structure 9. Each of the support organs 10 and 11 internally and rotatably supports respective support means 12 and 13 having horizontal axis normal to the direction of arrow F. The support means 12 and 13 are constituted by respective shafts 30 and 31, which are idle and supported by the said support organs 10 and 11 and which project to the outside of the said support organs 10 and 11 with a portion of their ends. On to each of the said end portions a cogged pulley 14 is keyed, and an internally cogged belt 15 is looped about a pulley couple 14 respectively associated to the shafts 30 and 31, which belt 15 and shafts 30 and 31 constitute what will hereinafter be defined as the kinematic connecting means of the support means 12 and 13. In FIG. 1, 25 denotes a protective case for the said kinematic means.

According to FIG. 3, and also with reference to FIG. 4, which illustrates a lateral view of the box structures 10 and 11 with their relative support means 12 and 13, on each shaft 30 and 31 a rotatably idle drum 32 and 33 is fitted, which drums 32 and 33 are sustained by the respective shafts 30 and 31. Compensator means 29 are interpositioned between each shaft 30 and 31 and each respective drums 32 and 33, which compensator means 29 are constituted by spiral springs 16 and 17, wound on the shafts 30 and 31 and anchored with their opposite ends to the said shafts 30 and 31 and respectively to the drums 32 and 33.

An end of a protection element or blind 18 and 19 is connected each to one of the drums 32 and 33, which blind 18 or 19 exhibits a portion which is wound several times around the relative drum 32 or 33, and exits with its free end through an inferior aperture 20 in the relative box structure 10 or 11. A guide means 26, constituted for example by a striker block 27 (see FIG. 2), or alternatively an idle roller 21 supported by a portion of each box structure 10 or 11 in the inferior area of the said inferior aperture 2 arranged below the relative blind 18 and 19 and possibly also a similar guide means constituted by an idle roller 22 arranged near to the superior zone of the inferior aperture 20 (see FIG. 3), reduce friction between the blinds 18 and 19 and the inferior openings 20 during the translations which, according to what will become clear hereinafter, the blinds 18 and 19 must perform through their relative inferior openings 20.

The spiral springs 16 and 17, also defined as compensator means 29, transmit motion between the shafts 30 and 31 and the respective drums 32 and 33, compensating for the diametral differences of the blind 18 and 19 portions wound on the respective drums 32 and 33 during the moving of the mobile operating element 7.

The portions of the blinds 18 and 19 external to the box structures 10 and 11 lay their inferior lateral edges on the respective said support elements 8, which, better to receive the blinds 18 and 19, are L-shaped in section (see FIG. 1) and the portions of the ends of the said portions of the blinds 18 and 19, previously free, are constrained to the ends of the support elements 8. Consequently, the portion of the blinds 18 and 19 external to the box structures 10 and 11 defines two protective planes extending between the ends of the support elements 8 and the box structures 10 and 11.

It should be specified that in the accompanying figures we make reference to a case in which the blinds 18 and 19 of the protective structure 9 will close the upper plane of the pit 24 of the machine or work unit 1, wherein the sliding plane 2 of the upright 3 of the operating element 7 is situated below the said upper or walking plane 28.

The functioning of the protective structure 9 according to the invention will now be described, making reference to some simple operative sequences of the work unit 1.

When the operating element 7 is to perform a translation in one of the directions indicated by the arrow F, for example leftwards, with reference to FIG. 2, the motor means 4, by means of the cogged wheel 5 meshing with the rack 6, cause such a movement of the upright 3. During the course of the movement, the blind 19 associated with the box structure 11 distancing itself from the longitudinal ends of the support elements 8 facing it is subjected to slight traction and unwinds from the relative drum 33, which drum 33 is set in rotation as can be seen in FIG. 3. The said rotation of the drum 33 causes a rotation of the shaft 31 through the spring 17: through the pulley couple 14 and the belt 15, which constitute the said kinematic means, motor is transmitted to the shaft 30 which, in its turn, through the spiral spring 16, transmits motion to the drum 32 and the blind 18. The blind 18, thanks to its direct connection with the belt 15, is wound on.

Obviously, the diameters which the blinds 18 and 19 are wound on to or unwound from are almost always different between themselves and thus the peripheral velocities of the portions of blinds 18 and 19 wound on the drums 32 and 33 are different, while the shafts 30 and 31 are set in rotation with equal angular velocity, the pulleys 14 being identical. The task of varying the angular velocity of the drums 32 and 33 in respect of the diameters which the blinds 18 and 19 are wound on or unwound from in order that the peripherical velocity is the same is performed by the spiral springs 16 which permit of compensating for the different diameters and thus of adapting the equal angular velocities of the internal shafts 30 and 31 to the differing angular velocities of the external drums 32 and 33. The blind 18 connected to the shaft 30 therefore begins to be progressively rewound on the drum 32 and consequently the two planes defined by the blinds 18 and 19 on the support element 8 progressively vary, one lengthening and the other shortening, thus keeping the overall surface unvaried.

Naturally, all of the above, made with reference to a case in which the upright 3 moves leftwards, as in FIG. 2, is equally true when the upright 3 moves rightwards, that is when the blind 18 is in the unwinding phase on drum 32 and the blind 19 is in the winding phase on drum 33.

The said structure provides the certainty that, during the course of the movements of the upright 3, the amount of blind 18 and 19 progressively unwound from the drums drums 32 and 33 and wound on the drums 33 and 32 contained in the box structures 10 and 11 is equal at all times.

It is evident from all of the preceding that the protective structure 9 described fully attains the set aims, since it is simple and economical and has no negative influence on the functioning of the work unit 1 incorporating the protective structure 9. The blinds 18 and 19 do not run between guides, with considerable friction, as happens in prior art protective structures, nor do they exert on the operating element 7 any force capable of altering its functioning, since the only force that the blinds 18 and 19 exert on the box structures 10 and 11 is that necessary to set the idle shafts 30 and 31 in rotation, which is almost negligible.

The invention as set out hereunin is susceptible to numerous modifications and variants, all falling within the field of the inventive idea.

For example, the cogged pulleys 14 could be substituted with cogged wheels for chains, which might be denoted by 14 in FIG. 1, and the internally cogged belt 15 would in such a case be substituted with a chain which would still be denoted by 15 in FIG. 1.

What is claimed:

1. A protective structure, in particular applicable to a machine tool or similar work unit, said similar work unit comprising a mobile portion having double acting linear movement including rotatable support elements fixed about respective mutually parallel axes which are normal to said direction of linear movement and which are supported by support organs connected to said mobile portion, the rotatable support elements are arranged on diametric sides of the mobile portion with respect to said direction of linear movement; blinds, respectively windable about said rotatable support elements, each blind having a respective first end connected to a corresponding rotatable support element and a second end connected to a fixed structure on which the mobile portion is supported; kinematic connecting means coupling the diametrically arranged rotatable support elements; and compensating means interpositioned and acting between said kinematic connecting means and said rotatable support elements to equalize the peripheral velocities of tracts of the blinds wound about said rotatable support elements; the tracts of said blinds which are not wound about the rotatable support elements being substantially stationary and exhibiting no linear movement relative to the fixed structure.

2. A protective structure as defined by claim 1, wherein said rotatable support elements are constituted by an internal shaft and an external drum, the internal shaft and external drum being kinematically coupled by means of said compensating means.

3. A protective structure as defined by claim 2, wherein each of said compensating means is constituted by a spring wound spirally about a respective shaft and anchored with its two ends respectively to said shaft and to said respective drum.

4. A protective structure as defined by claim 2, wherein each shaft and the corresponding respective drum is supported on a box structure for their housing and also for the housing of a portion of said blind wound on the drum.

5. A protective structure as defined by claim 4, further comprising, relative to each said blind, guide means for said blinds, arranged at an opening of said box structure which opening is the exit point of the portion of the said blind which is not wound on to said drum.

6. A protective structure as defined by claim 5, wherein said guide means comprise at least one idle roller having its axis parallel to the axes of said support elements.

7. A protective structure as defined by claim 2, wherein said kinematic connecting means of said rotatable support elements comprise two pulleys respectively connected coaxially to the support means, and a transmission belt wound about said two pulleys.

8. A protective structure as defined by claim 2, wherein said kinematic connecting means of said rotatable support elements comprise two cogged wheels respectively connected coaxially to the support means, and a transmission chain wound about said two cogged wheels.

* * * * *